(12) United States Patent
Wu

(10) Patent No.: US 10,634,567 B2
(45) Date of Patent: Apr. 28, 2020

(54) CALIBRATION METHOD AND CIRCUIT FOR PRESSURE SENSING DEVICE

(71) Applicant: PIXART IMAGING INC., Hsin-Chu (TW)

(72) Inventor: Sung-Han Wu, Hsin-Chu (TW)

(73) Assignee: PIXART IMAGING INC., Hsin-Chu (TW)

(*) Notice: Subject to any disclaimer, the term of this patent is extended or adjusted under 35 U.S.C. 154(b) by 155 days.

(21) Appl. No.: 15/730,396

(22) Filed: Oct. 11, 2017

(65) Prior Publication Data

US 2018/0259405 A1    Sep. 13, 2018

(30) Foreign Application Priority Data

Mar. 10, 2017   (TW) .............................. 106108033 A

(51) Int. Cl.
| | | |
|---|---|---|
| *G01L 1/14* | (2006.01) | |
| *G01L 9/00* | (2006.01) | |
| *G01L 25/00* | (2006.01) | |
| *G01L 27/00* | (2006.01) | |

(52) U.S. Cl.
CPC ............ G01L 1/146 (2013.01); G01L 9/0072 (2013.01); G01L 25/006 (2013.01); *G01L 27/00* (2013.01); *G01L 27/002* (2013.01); *G01L 27/005* (2013.01); *G01L 27/007* (2013.01)

(58) Field of Classification Search
CPC ..... G01L 1/146; G01L 25/006; G01L 9/0072; G01L 27/00; G01L 27/002; G01L 27/007
See application file for complete search history.

(56) References Cited

U.S. PATENT DOCUMENTS

| 5,905,209 A | 5/1999 | Oreper | |
|---|---|---|---|
| 6,374,191 B1* | 4/2002 | Tsuchiya | ............... G01L 27/002 |
| | | | 702/104 |
| 2016/0339945 A1* | 11/2016 | Kozawa | ................. B62D 5/049 |
| 2018/0052011 A1* | 2/2018 | Oshima | ................ H03K 17/975 |

FOREIGN PATENT DOCUMENTS

| CN | 101286103 A | 10/2008 |
|---|---|---|
| CN | 101576588 A | 11/2009 |
| CN | 101907962 A | 12/2010 |
| CN | 102200869 A | 9/2011 |
| CN | 104515646 A | 4/2015 |
| CN | 105008881 A | 10/2015 |
| CN | 106020559 A | 10/2016 |

OTHER PUBLICATIONS

Jian Tong, et al., "Pressure Probe Automatic Calibration and Data Process System", National Measurement and Testing Academic Conference, Nov. 1, 1998, pp. 791-795.

* cited by examiner

*Primary Examiner* — Randy W Gibson
*Assistant Examiner* — John M Royston
(74) *Attorney, Agent, or Firm* — Li & Cai Intellectual Property (USA) Office

(57) ABSTRACT

The present disclosure illustrates a calibration method and circuit for a pressure sensing device. The calibration method, via at least one passive component (e.g., the default capacitor) installed in the pressure sensing device, obtains a calibration gain factor of at least one converter also installed in the pressure sensing device, and when the pressure sensing device is in a regular operating mode, the calibration gain factor can be used to calibrate the output of the converter, so that a sensing signal inputted into the pressure sensing device can be correctly converted to a relevant pressure value.

8 Claims, 6 Drawing Sheets

US 10,634,567 B2

CALIBRATION METHOD AND CIRCUIT FOR PRESSURE SENSING DEVICE

BACKGROUND OF THE INVENTION

1. Field of the Invention

The present disclosure relates to a calibration method and circuit for a pressure sensing device; more particularly, to a calibration method and circuit for a pressure sensing device capable of being applied to capacitive sensor.

2. Description of Related Art

Generally speaking, since capacitive sensors are more stable among various types of touch sensors available on the market, and are provided with higher signal to noise ratio (SNR), capacitive sensors have gradually become the mainstream in the field of sensor application (e.g., touch sensing or pressure sensing). For example, as for pressure sensing devices used in capacitive sensor, the principle thereof is that by the changing of capacitance generated by the capacitive sensor due to the pressure from an external object (e.g., a user's finger or a metal conductive) imposed thereon, determination of the magnitude of the pressure applied to the capacitive sensor can then be measured.

Simply speaking, the above mentioned pressure sensing device utilizes at least one converter installed inside the device to receive and estimate the magnitude of the sensing capacitance generated from the external capacitive sensor when is under pressure. However, conventional converters are easily affected by poor manufacturing, thereby causing incorrect estimations on the magnitude of the sensing capacitances, further resulting in the sensing capacitances unable to be correctly converted into the correlated pressure value.

SUMMARY OF THE INVENTION

A calibration method for a pressure sensing device is provided in the present disclosure. The pressure sensing device includes a converter, an analog-to-digital converter (ADC) and at least one passive component. The steps of the calibration method are as follows. Firstly, obtaining, by the passive component, a calibration gain factor corresponding to the converter. Next, utilizing the calibration gain factor to calibrate a digital signal outputted by the ADC, so as to generate a calibrated digital signal. The converter couples to an input pin of the pressure sensing device and receive a sensing signal from the input pin, and outputs an analog signal. The ADC couples to the converter to convert the analog signal into the digital signal.

A calibration circuit is provided by another embodiment of the present disclosure, which is adapted for a pressure sensing device. The pressure sensing device includes a converter, an analog-to-digital converter (ADC) and at least one passive component. The calibration circuit includes: a gain generating circuit coupled to the ADC, configured to obtain, according to passive component, a calibration gain factor corresponding to the converter; and a processor coupled to the ADC and the gain generating circuit, configured to utilize the calibration gain factor to calibrate a digital signal outputted by the ADC, and to generate the calibrated digital signal. The converter couples to an input pin of the pressure sensing device and receive a sensing signal from the input pin, and outputs an analog signal. The ADC couples to the converter to convert the analog signal into the digital signal.

Preferably, the passive component is a predetermined capacitor, when the pressure sensing device is in a training mode, a content of the sensing signal represents a fixed capacitance the predetermined capacitor has, and when the pressure sensing device is in a regular operating mode, the content of the sensing signal represents a sensing capacitance generated by at least one capacitive sensor when is under pressure, in which the input pin is configured to connect the pressure sensing device to an output terminal of the capacitive sensor.

Preferably, when the pressure sensing device is in the regular operating mode, the calibration method utilizes the calibration gain factor to calibrate the digital signal outputted by the ADC, and to generate the digital signal being calibrated.

Preferably, when the pressure sensing device is in a built-in self-detection mode, the predetermined capacitor, through the input pin, is connected between a sensing line and a first driving line of the capacitive sensor, and is configured to detect if a short condition occurs between the first driving line and a second driving line of the capacitive sensor adjacent to the first driving line.

Preferably, the pressure sensing device further includes a digital signal processor (DSP) coupled to the calibration circuit, and when the pressure sensing device is in the regular operating mode, the DSP is configured to generate, according the calibrated digital signal, a pressure sensing value correlated to the sensing signal.

In sum, the calibration method and circuit for the pressure sensing device as provided in the embodiments of the present disclosure can, by the at least one passive component built in the pressure sensing device, obtain the related calibration gain factor of the at least one converter also built in the pressure sensing device, and when the pressure sensing device is in the regular operating mode, the calibration gain factor can be used to calibrate the output of the converter, so that the sensing signal inputted into the pressure sensing device can be correctly converted to a relevant pressure value.

In order to further the understanding of the present disclosure, the following embodiments are provided along with illustrations to facilitate the disclosure of the present disclosure.

DETAILED DESCRIPTION OF THE PREFERRED EMBODIMENTS

The aforementioned illustrations and following detailed description are exemplary for the purpose of further explaining the scope of the present disclosure. Other objectives and advantages related to the present disclosure will be illustrated in the following description and appended drawings.

Figure 1:
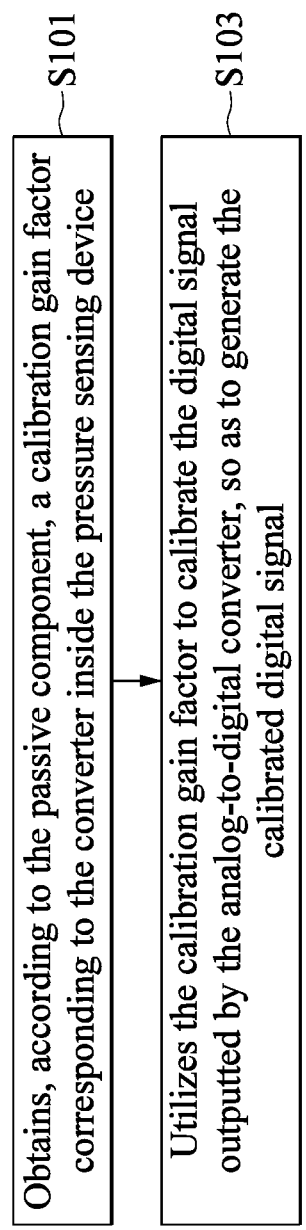
FIG. 1 is a flowchart of the calibration method of the pressure sensing device according to an embodiment of the present disclosure.
Figure 2:
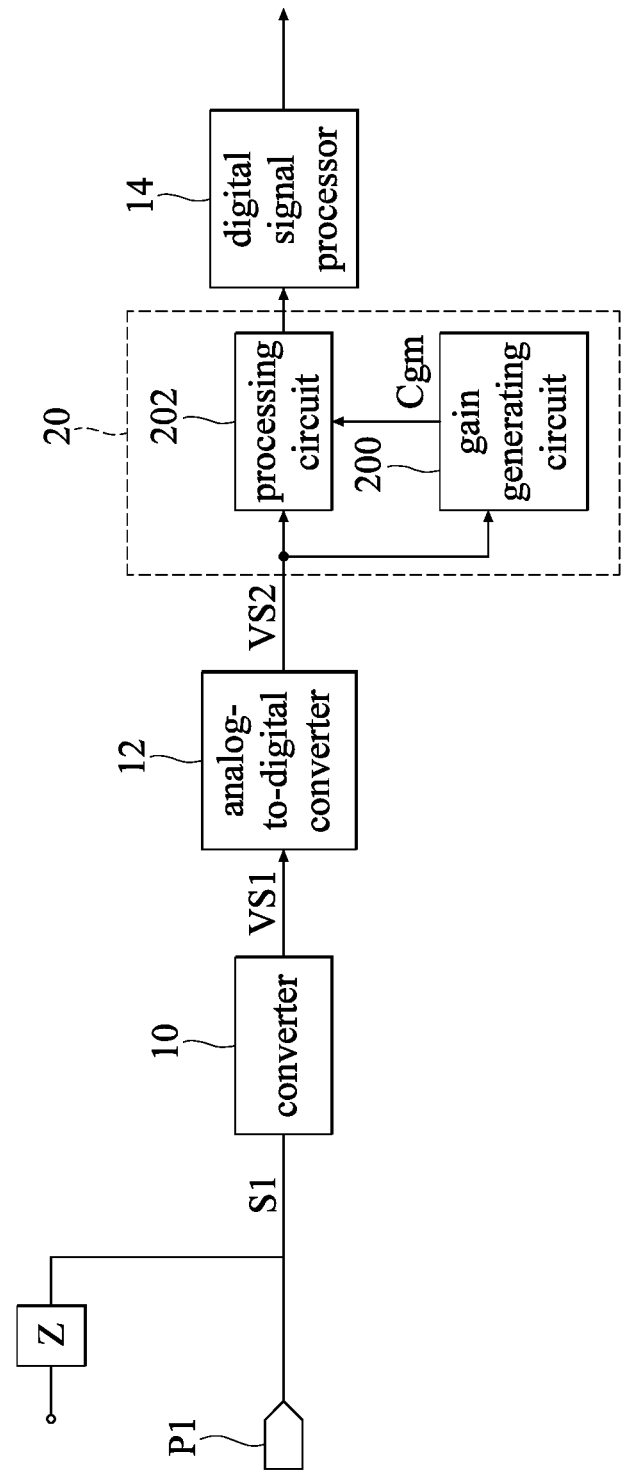
FIG. 2 is a schematic view illustrating the calibration circuit of the pressure sensing device according to an embodiment of the present disclosure.

References are made to FIGS. 1 and 2, where FIG. 1 is a flowchart of the calibration method of the pressure sensing device according to an embodiment of the present disclosure, and FIG. 2 is a schematic view illustrating the calibration circuit of the pressure sensing device according to an embodiment of the present disclosure. Capacitive pressure sensing device is taken as example in these embodiments, and the calibration method of the pressure sensing device as shown in FIG. 1 may be applied to the calibration circuit of FIG. 2, but the present disclosure does not limit that the method can only be used in the calibration circuit. Moreover, the calibration circuit as shown in FIG. 2 illustrates only one of the implementations for the calibration method of the pressure sensing device, and thus should not limit the scope of the present disclosure.

The pressure sensing device 1 according to the embodiment of the present disclosure can be applied to any kinds of capacitive sensors. In other words, how to implement the capacitive sensor is not limited in the present disclosure. Therefore, the pressure sensing device 1 according to the embodiment of the present disclosure does not need a built-in capacitive sensor. Rather, when the pressure sensing device 1 is in a regular operating mode, an internal converter 10 is utilized to receive a sensing capacitance generated by an external capacitive sensor as being pressured, and then converts the sensing capacitance into a relative pressure value. Furthermore, the implementation of the pressure sensing device 1 is not limited in the present disclosure either. The pressure sensing device 1 may have a training mode and a built-in self-detection mode.

Reference is made to FIG. 2, in which the pressure sensing device 1 includes at least one converter 10, an analog-to-digital converter (ADC) 12 and at least one passive component Z for a built-in self-detection mode. The converter 10 couples to an input pin P1 of the pressure sensing device 1, and receives a sensing signal S1 from the input pin P1, thereby outputting an analog signal VS1. The ADC 12 couples to the converter 10, and is configured to convert the analog signal VS1 into a digital signal VS2.

For the sake of convenience, the number of the converter 10 would be 1 in the embodiment for the following description; however, the number of the converter should not limit the scope of the present disclosure. In other words, there might be more than 2 converters 10 in the pressure sensing device 1 according to the embodiment of the present disclosure. When the pressure sensing device 1 is in the regular operating mode, each of the converters 10 would couple, respectively, to an output terminal of a signal capacitive sensor; or, by the use of a switch, thus allowing a single converter 10 to concurrently couple to the output terminals of multiple capacitive sensors. It is noted that the above description should not limit the scope of the present disclosure, and people with ordinary skill in the art can, by practical demands, adjust the relevant design accordingly.

Figure 3:
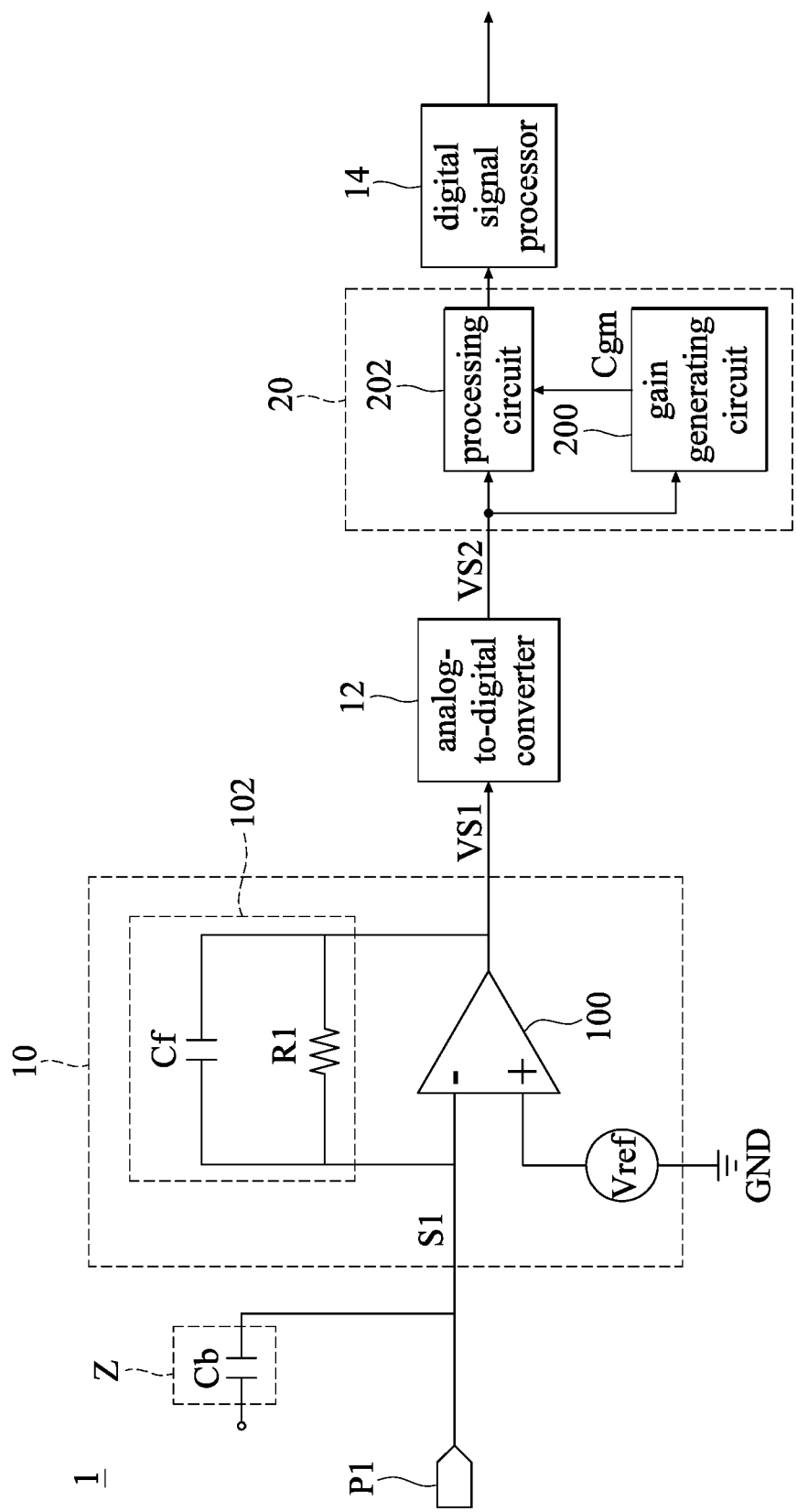
FIG. 3 is a schematic view illustrating the converter of the pressure sensing device of FIG. 2 of a preferred embodiment.

The typical implementation of the converter 10 is not limited. In one of the implementations, the converter 10 can be, but not limited to, a capacitance-to-voltage converter. It is further noted that the typical implementation of the capacitance-to-voltage converter is not limited. In the following description, the converter 10 is a capacitance-to-voltage converter including a feedback capacitor Cf and a resistor R1. Reference is made to FIG. 3, where FIG. 3 is a schematic view illustrating the converter of the pressure sensing device of FIG. 2 of a preferred embodiment.

Moreover, the typical implementation of the passive component Z is not limited. In one of the implementations, the passive component Z can be a predetermined capacitor Cb as shown in FIG. 3. In other implementations, the passive component Z can also be a predetermined resistor (not shown in the figure), a predetermined inductor (not shown in the figure) and etc. It is noted that the above description should not limit the scope of the present disclosure, and people with ordinary skill in the art can, by practical demands, adjust the relevant design of the passive component Z accordingly.

As shown in FIG. 3, the converter 10 includes an operational amplifier 100 and a negative feedback circuit 102. The inverting input of the operational amplifier 100 couples to the input pin P1, the non-inverting input of the operational amplifier 100 couples to a reference voltage Vref, and the output terminal of the operational amplifier 100 couples to the ADC 12. Moreover, the negative feedback circuit 102 is coupled between the inverting input and the output terminal of the operational amplifier 100, and is composed of a feedback capacitor and a resistor connected in parallel. Since the principle of the capacitance-to-voltage converter is well known to those with ordinary skill in the art, and thus the relevant details of the operational amplifier 100 and the negative feedback circuit 120 would be omitted for the sake of brevity.

As addressed above, when the pressure sensing device 1 as shown in FIG. 3 is in the regular operating mode, since the capacitance-to-voltage converter (i.e., the converter 10) can be easily affected by the poor manufacturing of the feedback capacitor Cf and other noises, it could lead to that the sensing capacitance (i.e., the sensing signal S1) inputted into the pressure sensing device 1 of FIG. 3 is unable to be correctly converted into the relevant pressure value. Therefore, according to the above description, one with ordinary skill in the art can understand that, by detecting the relationship between the feedback capacitor Cf and the passive component Z (e.g., the predetermined capacitor Cb) which has been installed inside the pressure sensing device 1, the calibration gain factor Cgm of the capacitance-to-voltage converter (i.e., the converter 10) can be obtained, and when the pressure sensing device 1 is in the regular operating mode, the digital signal VS2 of the ADC 12 can be calibrated through the calibration circuit 20 by utilizing the calibration gain factor Cgm, so that the sensing signal S1 inputted into the pressure sensing device 1 can be correctly converted to a relevant pressure value.

It should be noted that, the passive component Z (e.g., the predetermined capacitor Cb) that has been installed in the pressure sensing device 1 can be seen as an essential element when composing the pressure sensing device 1 of the present disclosure. That is to say, when the pressure sensing device 1 is in a certain operation mode (e.g., the built-in self-detection mode according to the present embodiment), the passive component Z would be configured to be in charge of a certain function, such as to detect an internal circuit of the pressure sensing device 1. The passive component Z has a known circuit parameter (e.g., a known resistance, a known capacitance or a known inductance), so the passive component Z can be used as a circuit parameter reference value for the internal circuit of the pressure sensing device 1. Therefore, it preferably is that when the pressure sensing device 1 is not in the built-in self-detection mode (e.g., in the training mode), the calibration method and circuit of the present embodiment would then directly use the idle passive component Z to obtain the calibration gain factor Cgm relative to the converter 10, so that the design cost for the circuit structure can be efficiently decreased.

According to the above details, one with ordinary skill in the art can realize that, the examples shown in FIGS. 2 and 3 can also be used to explain when the pressure sensing device 1 is under the training mode. It is worth to note that, as addressed previously, the implementation of the passive component Z is not limited. Therefore, continuing with FIG. 3 as an example, when the pressure sensing device 1 is in the training mode (i.e., the pressure sensing device 1 has not yet received the capacitor signal form the capacitive sensor), the content of the sensing signal S1 can be represented as the fixed capacitance (i.e., the predetermined capacitor Cb) the passive component Z has.

Figure 4:
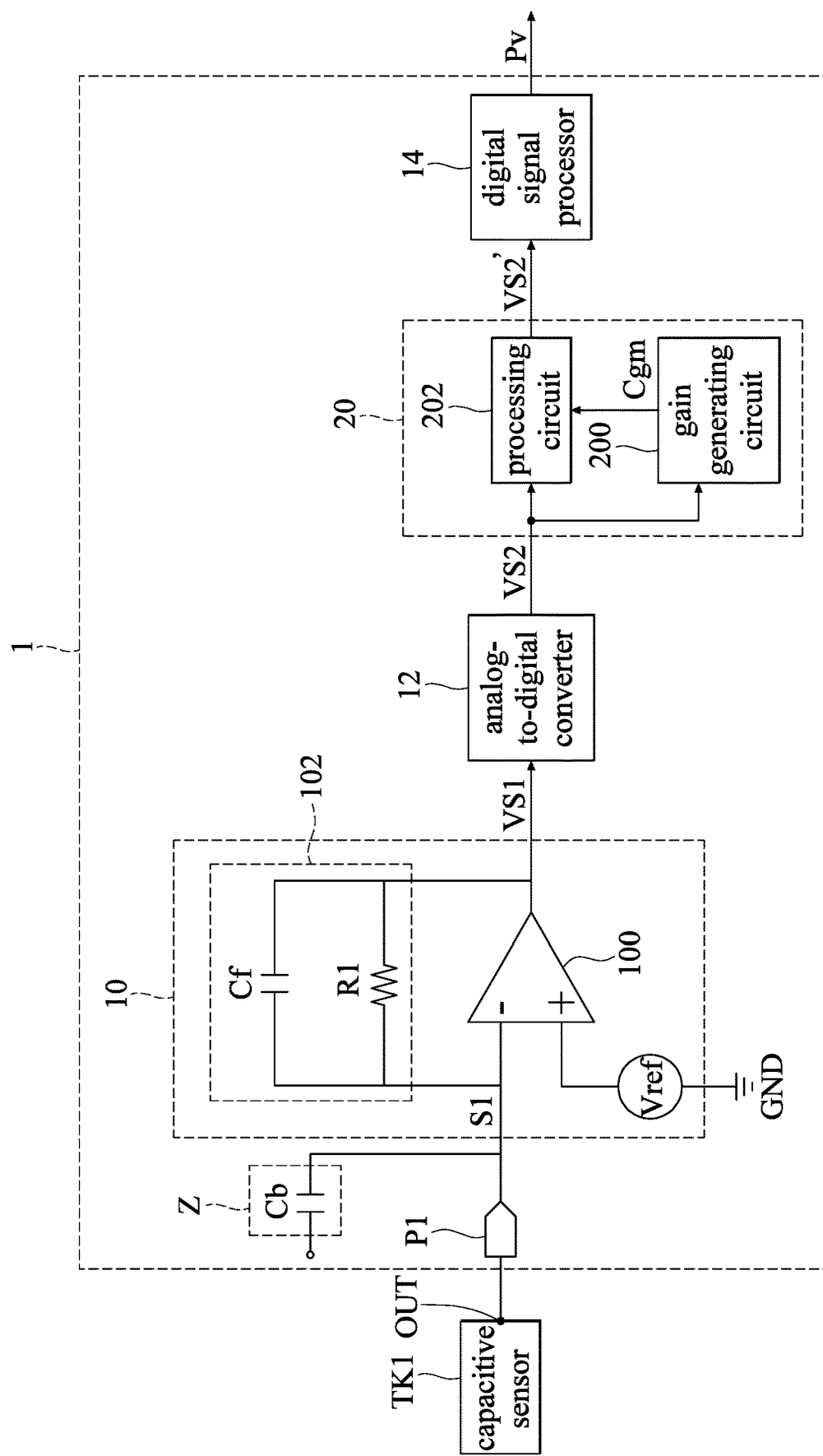
FIG. 4 is a schematic view illustrating the application of the pressure sensing device of FIG. 3 in a regular operating mode.

Reference is next made to FIG. 4 in order to further elaborate the details of the calibration circuit 20 of the present disclosure, where FIG. 4 is a schematic view illustrating the application of the pressure sensing device 1 of FIG. 3 in a regular operating mode. The implementation of the calibration circuit 20 that would be described below should not be construed as limitations to the present disclosure.

To be more specific, the calibration circuit 20 may include a gain generating circuit 200 and a processing circuit 202. The above mentioned elements can be realized by hardware, or by hardware in combination with software, and the implementation of the calibration circuit 20 should not be limited thereto. Moreover, the above mentioned elements can be integrated, or installed separately, and no limitations should be imposed thereupon.

The gain generating circuit 200 couples to the ADC 12, and when the pressure sensing device 1 is in the training mode (i.e., as shown in FIGS. 2 and 3), the gain generating circuit 200 would, according to the passive component Z (e.g., the predetermined capacitor Cb), obtain the calibration gain factor Cgm corresponding to the converter 10. The processing circuit 202 is coupled between the ADC 12 and the gain generating circuit 200, and when the pressure sensing device 1 is in the regular operating mode (i.e., as shown in FIG. 4), the processing circuit 202 would utilize the calibration gain factor Cgm to calibrate the digital signal VS2 outputted by the ADC 12, so as to generate the calibrated digital signal VS2'.

In a typical configuration, the pressure sensing device 1 can further include a digital signal processor 14. The digital signal processor 14 couples to the ADC 12 through the processing circuit 202, and when the pressure sensing device 1 is in the regular operating mode (i.e., as shown in FIG. 4), the digital signal processor 14 would generate a pressure sensing value Pv relative to the sensing signal S1 according to the calibrated digital signal VS2'. The relevant details of digital signal processor 14 are well known in the art, and thus these relevant details would be omitted for the sake of brevity.

It should be understood that, when the pressure sensing device 1 is in the regular operating mode (i.e., as shown in FIG. 4), the content of the sensing signal S1 can be represented as the sensing capacitance generated by the at least one capacitive sensors TK1~TKN when is under pressure. The input pin P1 is used to couple the pressure sensing device 1 to the output terminal OUT of the capacitive sensors TK1~TKN. The number of capacitive sensors TK1~TKN is 1 (i.e., N=1) for convenience. Moreover, the relevant details of capacitive sensor TK1 is well known in the art, and thus these relevant details would be omitted for the sake of brevity.

Reference is made back to FIG. 3. Since when the pressure sensing device 1 is in the training mode, the content of the sensing signal S1 is represented as the fixed capacitance the predetermined capacitor Cb (i.e., the passive component Z) has, and thus when the predetermined capacitor Cb is inputted into the capacitance-to-voltage converter (i.e., the converter 10), the gain generating circuit 200 can obtain a capacitance ratio (not shown in the figure) between the predetermined capacitor Cb and the feedback capacitor Cf. Next, according to the capacitance ratio, the gain generating circuit 200 can estimate a calculated value of the feedback capacitor Cf.

For instance, assuming that the predetermined capacitor is fixed at 1 pF and capacitance ratio the gain generating circuit 200 can obtain is 20.5, which implies that the calculated value of the feedback capacitor Cf estimated by the gain generating circuit 200 is 20.5 pF. The above mentioned implementation is only for explanation, and thus should not be used to limit the scope of the present disclosure. In other words, the present disclosure does not limit how to estimate the calculated value of the feedback capacitor Cf, and therefore one with ordinary skill in the art can have different deigns according to different practical demands.

Furthermore, the gain generating circuit 200 may further, according to the ratio between the calculated value and a reference value (not shown in the figure) of the feedback capacitor Cf, obtain the calibration gain factor Cgm corresponding to the capacitance-to-voltage converter (i.e., the converter 10). In practice, the gain generating circuit 200 may utilize the calculated value and the reference value of the feedback capacitor Cf to perform division operation to obtain the calibration gain factor Cgm corresponding to the capacitance-to-voltage converter (i.e., the converter 10). It is noted that the above description is only for explanation and thus should not limit the scope of the present disclosure. For example, in other implementations, the gain generating circuit 200 may also perform multiplication operation or statistical operation on the calculated value and the feedback capacitor Cf to obtain the calibration gain factor Cgm corresponding to the capacitance-to-voltage converter (i.e., the converter 10).

The reference value may be the expected target capacitance of the feedback capacitor Cf under ideal manufacturing. Therefore, assuming that the reference value is 20 pF and the calculated value of the feedback capacitance is 20.5 pF, the calibration gain factor Cgm of the capacitance-to-voltage converter (i.e., the converter 10) the gain generating circuit 200 can obtain is 1.025 (i.e., 20.5/20). In other words, due to the negative affect caused by internal manufacturing, the actual capacitance (i.e., the calculated value) of the feedback capacitor Cf would be 0.025 times (e.g., 0.5 pF more) the gain as compared to the expected target capacitance (i.e., the calculated value) under ideal manufacturing.

As shown in FIG. 4, when the pressure sensing device 1 is in the regular operating mode, and under the situation that the capacitive sensor TK1 is being pressed, the processing circuit 202 may utilize the calibration gain factor Cgm (e.g., 1.025) to calibrate the digital signal SV2 outputted by the ADC 12, so as to cancel the 0.025 times gain caused by the feedback capacitor Cf, and to generate the calibrated digital signal VS2', allowing the sensing signal S1 inputted into the pressuring sensing device 1 being able to be correctly converted to relevant pressure sensing value Pv.

The implementations as addressed above are also examples, and thus should not be used to limit the scope of the present disclosure. In general, how to obtain the calibration gain factor Cgm of the converter 10 is not limited to above implementations, and therefore one with ordinary skill in the art can adjust it accordingly to meet with different demands. Reference is next made back to FIG. 1 for further descriptions on the calibration method for the pressure sensing device 1. The calibration method as shown in FIG. 1 can be applied to the calibration circuit 20 as shown in FIG. 2. The calibration method for the pressure sensing device is addressed as the following steps.

In step S101: obtains, according to the passive component Z, a calibration gain factor Cgm corresponding to the converter 10 inside the pressure sensing device 1. Next in step S103: utilizes the calibration gain factor Cgm to calibrate the digital signal VS2 outputted by the ADC 12, so as to generate the calibrated digital signal VS2'.

With the above description, one with ordinary skill in the art can understand that the detailed implementation in step S103 of FIG. 1 would be, that when the pressure sensing device 1 is in the regular operating mode, the calibration gain factor Cgm is utilized to calibrate the digital signal VS2 outputted by the ADC 12, so as to generate the calibrated digital signal VS2'. Moreover, for the converter 10 to be the capacitance-to-voltage converter (i.e., as shown in FIG. 3) with the feedback capacitor Cf and the resistor R1, the detailed implementation in step S101 of FIG. 1 would be, that when the pressure sensing device 1 is in the training mode, the passive component Z (e.g., the predetermined capacitor Cb as shown in FIG. 3) is utilized to estimate the calculated value of the feedback capacitor Cf, and to obtain the calibration gain factor Cgm of the capacitance-to-voltage converter (i.e., the converter 10) according to a ratio value between the calculated value and a reference value of the feedback capacitor Cf. It should be noted that the above addressed implementations are examples for describing, and should not limit the scope of the present disclosure.

Figure 5:
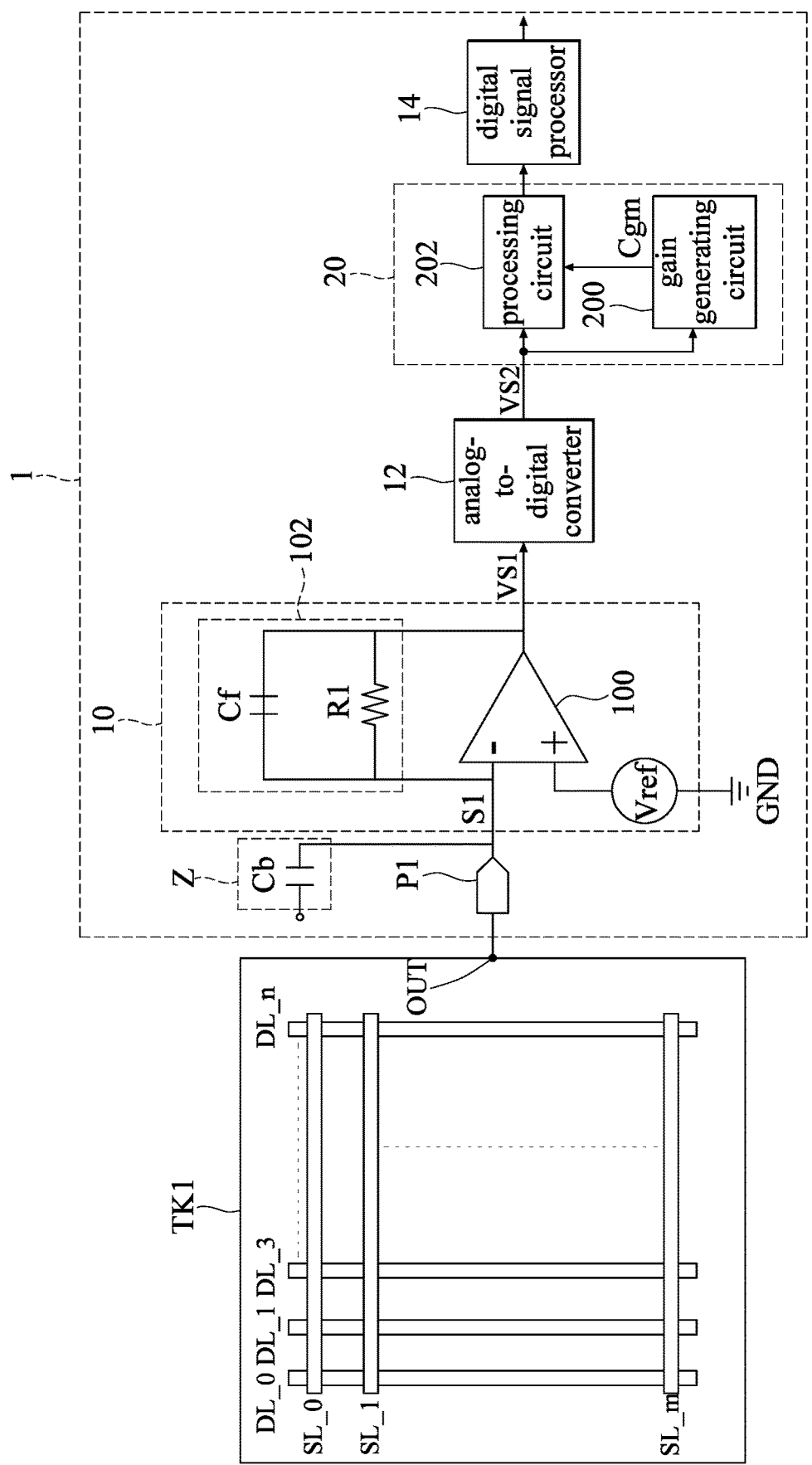
FIG. 5 is a schematic view illustrating the application of the pressure sensing device of FIG. 3 in a built-in self-detection mode.

In order to further illustrate the detailed implementations of the passive component Z, a method for implementing is further provided accordingly. Reference is then made to FIG. 5, where FIG. 5 is a schematic view illustrating the application of the pressure sensing device of FIG. 3 in a built-in self-detection mode.

In the embodiment as shown in FIG. 5, the passive component Z may by the predetermined capacitor Cb as described previously, and the capacitive sensor TK1 includes a plurality of driving lines DL_0~DL_n arranged along the y-axis and a plurality of sensing lines SL_0~SL_m arranged along the x-axis. A plurality of sensing cells are formed by the intervening of the plurality of driving lines DL_0~DL_n and the plurality of sensing lines SL_0~SL_m. The capacitive sensor TK1, through driving the plurality of driving lines DL_0~DL_n, obtains the variation of the sensing capacitance of the sensing cells from the plurality of sensing lines SL_0~SL_m. Since the principles of capacitive sensor TK1 are well known to people with ordinary skill in the art, the related descriptions for driving lines DL_0~DL_n and sensing lines SL_0~SL_m are omitted for the sake of brevity.

However, when short circuit condition occurs between two adjacent driving lines DL0 and DL1, the sensing cells corresponding to these driving lines DL0 and DL1 and the sensing line SL_0 would be affected by the short circuit condition, so it is unable to obtain the variation of the sensing capacitance from the corresponding sensing cells. Therefore, the predetermined capacitor Cb (i.e., the passive component Z) of the present embodiment would be, by the input pin P1, coupled between the sensing line SL_0 and the driving line DL_1 of capacitive sensor TK1, and when the pressure sensing device 1 is in the built-in self-detection mode, the predetermined capacitor Cb would detect whether short circuit has occurred between the driving lines DL_1 and DL_0, so as allows that the short circuit condition would only affect one single sensing cell.

The short circuit condition occurring between the driving lines DL_1 and DL_0 of the present embodiment is only an example, and thus should not limit the scope of the present disclosure. In other words, the predetermined capacitor Cb may be coupled between any of the sensing lines SL_i and any of the driving lines DL_j of the capacitive sensor TK1 through the input pin P1 (i.e., i is an integer between 0 and m, and j is an integer between 0 and n). When the pressure sensing device 1 is in the built-in self-detection mode, the predetermined capacitor Cb would be configured to detect whether a short circuit condition occurs between the driving line DL_j and the adjacent driving line DL_k (i.e., k is an integer of j+1 or j−1).

In sum, one of the proposes of the present disclosure is that the pressure sensing device 1 is expected to accurately estimate the intensity of the sensing capacitance received and provided by the external capacitive sensor TK1. But the converter 10 of the pressure sensing device 1 could be easily affected by the poor manufacturing to the key internal elements (e.g., the feedback capacitor Cf as shown in FIGS. 3 and 4), or affected by the operating environment, so as to generate error estimation on the intensity of the sensing capacitance, one of the purposes of the present disclosure is, by the passive component Z (e.g., the predetermined capacitor Cb) as installed in the pressure sensing device 1 to obtain the actual gain of the relevant key internal element, further to obtain the calibration gain factor Cgm corresponding to the converter 10.

However, as addressed previously, the implementations of the converter 10 are not limited in the present disclosure. In another application, the converter 10 can be an oscillator made of resistor/capacitor (RC), resistor/inductor/capacitor (RLC) or inductor/capacitor (LC). Generally speaking, no limitations should be imposed on the implementations for the converter 10. That is to say, when the converter 10 is embodied in other forms, the passive component Z would still be utilized to obtain the actual gain of the relevant internal key element, further to obtain the calibration gain factor Cgm of the converter 10.

Figure 6:
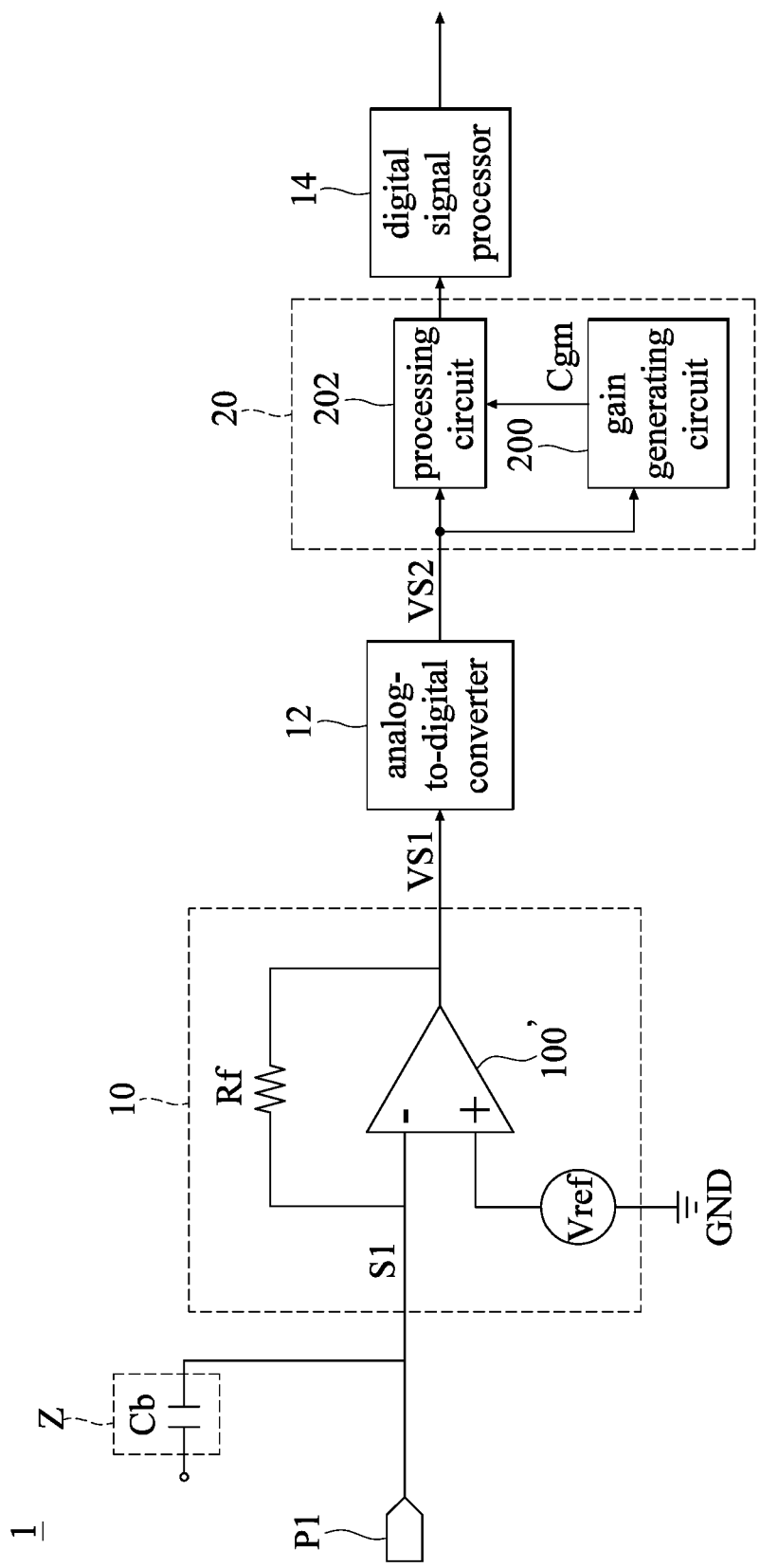
FIG. 6 is a schematic view illustrating the converter of the pressure sensing device of FIG. 2 of another preferred embodiment.

Next, another embodiment would be illustrated in the following for further explanation to the calibration method and circuit of the present disclosure, and that is how to obtain the calibration gain factor corresponding to the converter 10 by the passive component Z (e.g., the predetermined capacitor Cb). Reference is next made to FIG. 6, where FIG. 6 is a schematic view illustrating the converter of the pressure sensing device of FIG. 2 of another preferred embodiment. Element numbers in FIG. 6 that are the same as those in FIG. 3 would not further be described for the sake of brevity.

In the embodiment as shown in FIG. 6, the converter 10 includes an operational amplifier 100' and a feedback resistor Rf. The inverting input of the operational amplifier 100' couples to the input pin P1, the non-inverting input of the operational amplifier 100' couples to a reference voltage Vref, and the output terminal of the operational amplifier 100' couples to the ADC 12. The feedback resistor Rf is coupled between the inverting input and the output terminal of the operational amplifier 100'. It should be understood that, when the pressure sensing device 1 as shown in FIG. 6 is in the regular operating mode, the converter 10 would be affected by the poorly manufactured internal feedback resistor Rf, further resulting in that the sensing capacitance (i.e., the sensing signal S1) inputted into the pressure sensing device 1 is unable to be correctly converted into relative pressure value.

Therefore, in the present embodiment, the relationship between the passive component Z that has been installed in the pressure sensing device 1 and the feedback resistor Rf would be used instead, to obtain the calibration gain factor Cgm of the converter 10, and when the pressure sensing device 1 is in the regular operating mode, the calibration gain factor Cgm can be used to calibrate the digital signal VS2 outputted by the ADC 12, so as allows that the sensing signal S1 inputted into the pressure sensing device 1 can be correctly converted into the relevant pressure value. That is to say, when the converter 10 is applied under the above-mentioned situation, with respect to detailed implementation in step S101, the passive component Z may be used to estimate the calculated value of the feedback resistor Rf, and to obtain the calibration gain factor Cgm corresponding to the converter 10 according to the ratio value between the calculated value and the reference value of the feedback resistor Rf. Other relevant details are the same as those addressed previously, and thus would be omitted for the sake of brevity.

In sum, the calibration method and circuit for the pressure sensing device as provided in the embodiments of the present disclosure can, by the at least one passive component built in the pressure sensing device, obtain the related calibration gain factor of the at least one converter also built in the pressure sensing device, and when the pressure sensing device is in the regular operating mode, the calibration gain factor can be used to calibrate the output of the converter, so that the sensing signal inputted into the pressure sensing device can be correctly converted to a relevant pressure value. On the other hand, only when the pressure sensing device 1 is in the training mode, the idle passive component would be used to obtain the calibration gain factor corresponding to the converter, so as to effectively decrease the cost for circuit design.

The description illustrated supra set forth simply the preferred embodiments of the present disclosure; however, the characteristics of the present disclosure are by no means restricted thereto. All changes, alterations, or modifications conveniently considered by those skilled in the art are deemed to be encompassed within the scope of the present disclosure delineated by the following claims.

What is claimed is:

1. A calibration method for a pressure sensing device, wherein the pressure sensing device includes a converter, an analog-to-digital converter (ADC) and at least one passive component, comprising:
    obtaining, by the passive component, a calibration gain factor corresponding to the converter; and
    utilizing the calibration gain factor to calibrate a digital signal outputted by the ADC, so as to generate a calibrated digital signal;
    wherein the converter couples to an input pin of the pressure sensing device and receives a sensing signal from the input pin, and outputs an analog signal;
    wherein the ADC couples to the converter to convert the analog signal into the digital signal;
    wherein the converter is a capacitance-to-voltage converter including:
    an operational amplifier, having an inverting input coupling to the input pin, a non-inverting input coupling to a reference voltage, and an output terminal coupling to the ADC; and
    a negative feedback circuit, coupled between the inverting input and the output terminal of the operational amplifier;
    wherein the negative feedback circuit is composed of a feedback capacitor and a resistor connected in parallel.

2. The calibration method according to claim 1, wherein the passive component is a predetermined capacitor, when the pressure sensing device is in a training mode, a content of the sensing signal represents a fixed capacitance the predetermined capacitor has, and when the pressure sensing device is in a regular operating mode, the content of the sensing signal represents a sensing capacitance generated by at least one capacitive sensor when is under pressure, wherein the input pin is configured to connect the pressure sensing device to an output terminal of the capacitive sensor.

3. The calibration method according to claim 2, wherein when the pressure sensing device is in the regular operating mode, the calibration method utilizes the calibration gain factor to calibrate the digital signal outputted by the ADC, and to generate the digital signal being calibrated.

4. The calibration method according to claim 1, wherein the step obtaining, by the passive component, a calibration gain factor corresponding to the converter includes:
    utilizing, when the pressure sensing device is in the training mode, the passive component to estimate a calculated value of the feedback capacitor and, obtaining the calibration gain factor corresponding to the converter according to a ratio between the calculated value and a reference value of the feedback capacitor.

5. The calibration method according to claim 3, wherein the converter includes:
    an operational amplifier, having an inverting input coupling to the input pin, a non-inverting input coupling to a reference voltage, and an output terminal coupling to the ADC; and
    a feedback resistor, coupled between the inverting input and the output terminal of the operational amplifier.

6. The calibration method according to claim 5, wherein the step of obtaining, by the passive component, a calibration gain factor corresponding to the converter includes:
    utilizing, when the pressure sensing device is in the training mode, the passive component to estimate a calculated value of the feedback capacitor and, obtaining the calibration gain factor corresponding to the converter according to a ratio between the calculated value and a reference value of the feedback capacitor.

7. The calibration method according to claim 3, wherein the pressure sensing device includes:
    a digital signal processor (DSP) coupled to the ADC, and when the pressure sensing device is in the regular operating mode, the DSP is configured to generate, according the calibrated digital signal, a pressure sensing value correlated to the sensing signal.

8. The calibration method according to claim 3, wherein when the pressure sensing device is in a built-in self-detection mode, the predetermined capacitor, through the input pin, is connected between a sensing line and a first driving line of the capacitive sensor, and is configured to detect if a short condition occurs between the first driving line and a second driving line of the capacitive sensor adjacent to the first driving line.

* * * * *